(12) United States Patent
Yamane et al.

(10) Patent No.: US 6,175,873 B1
(45) Date of Patent: Jan. 16, 2001

(54) METHOD FOR ACQUIRING COMMUNICATION INFORMATION

(75) Inventors: Kenichi Yamane, Yamatokoriyama; Toshio Isoe, Tenri, both of (JP)

(73) Assignee: Sharp, Kabushiki Kaisha, Osaka (JP)

( * ) Notice: Under 35 U.S.C. 154(b), the term of this patent shall be extended for 0 days.

(21) Appl. No.: 09/046,125

(22) Filed: Mar. 23, 1998

(30) Foreign Application Priority Data

Mar. 26, 1997 (JP) .................................................. 9-072520

(51) Int. Cl.[7] ...................................................... G06F 15/16
(52) U.S. Cl. ........................... 709/237; 709/207; 709/229
(58) Field of Search .................................. 709/237, 206, 709/207, 229, 244; 455/412; 379/93.02, 90.01; 340/825.34; 713/200, 201; 705/8

(56) References Cited

U.S. PATENT DOCUMENTS

| | | | |
|---|---|---|---|
| 4,881,179 | * 11/1989 | Vincent et al. ........................ | 395/113 |
| 5,210,869 | * 5/1993 | Williams ................................. | 714/48 |
| 5,261,052 | * 11/1993 | Shimamoto et al. ................. | 395/200 |
| 5,283,856 | * 2/1994 | Gross et al. ........................... | 395/51 |
| 5,293,250 | * 3/1994 | Okumara et al. ..................... | 258/402 |
| 5,428,784 | * 6/1995 | Cahill, Jr. .............................. | 709/206 |
| 5,483,466 | * 1/1996 | Kawahara et al. ................... | 709/203 |
| 5,493,692 | * 2/1996 | Theimer et al. ...................... | 455/26.1 |
| 5,544,321 | * 8/1996 | Theimer et al. ................. | 395/200.11 |
| 5,603,054 | * 2/1997 | Theimer et al. ..................... | 395/826 |
| 5,611,050 | * 3/1997 | Theimer et al. ................. | 395/200.09 |
| 5,627,764 | * 5/1997 | Schutzman et al. .................. | 709/207 |
| 5,689,642 | * 11/1997 | Harkins et al. ................. | 395/200.04 |
| 5,691,713 | * 11/1997 | Ishida .............................. | 340/870.01 |
| 5,729,734 | * 3/1998 | Parker et al. ........................... | 707/9 |
| 5,787,428 | * 7/1998 | Hart ........................................ | 707/9 |
| 5,812,865 | * 9/1998 | Theimer et al. ...................... | 395/800 |
| 5,822,518 | * 10/1998 | Ooki et al. ............................ | 713/201 |
| 5,826,269 | * 10/1998 | Hussey .................................. | 707/10 |
| 5,845,257 | * 12/1998 | Fu et al. ................................. | 705/8 |
| 5,884,033 | * 3/1999 | Duvall et al. .................... | 395/200.36 |
| 5,887,140 | * 3/1999 | Itsumi et al. .......................... | 709/225 |
| 5,930,471 | * 7/1999 | Milewski et al. ............... | 395/200.04 |
| 6,047,376 | * 4/2000 | Hosoe ................................... | 713/201 |

FOREIGN PATENT DOCUMENTS 2185158  7/1990  (JP) .

* cited by examiner

*Primary Examiner*—Zarni Maung
*Assistant Examiner*—Jason D. Cardone

(57) ABSTRACT

A method for acquiring communication information in a communication system between a plurality of user communication terminals via a host computer on a network. The method includes registering, for each user communication terminal, beforehand in the host computer a user information including a communication confirmation schedule. The host computer transmits user information of a second user communication terminal to a first user communication terminal. This occurs when the host computer detects a communication connection from the first user communication terminal to the second user communication terminal.

10 Claims, 8 Drawing Sheets

FIG.3(a)

A MESSAGE FROM USER A

IT IS AFTER 9:00AM
OF JANUARY 22nd
THAT THE USER A CAN
CHECK EIECTRONIC
MAIL

FIG.3(b)

A MESSAGE FROM USER A

YOU ARE NOT PERMITTED
TO SEE THE MESSAGE
REGISTERED BY THE USER A

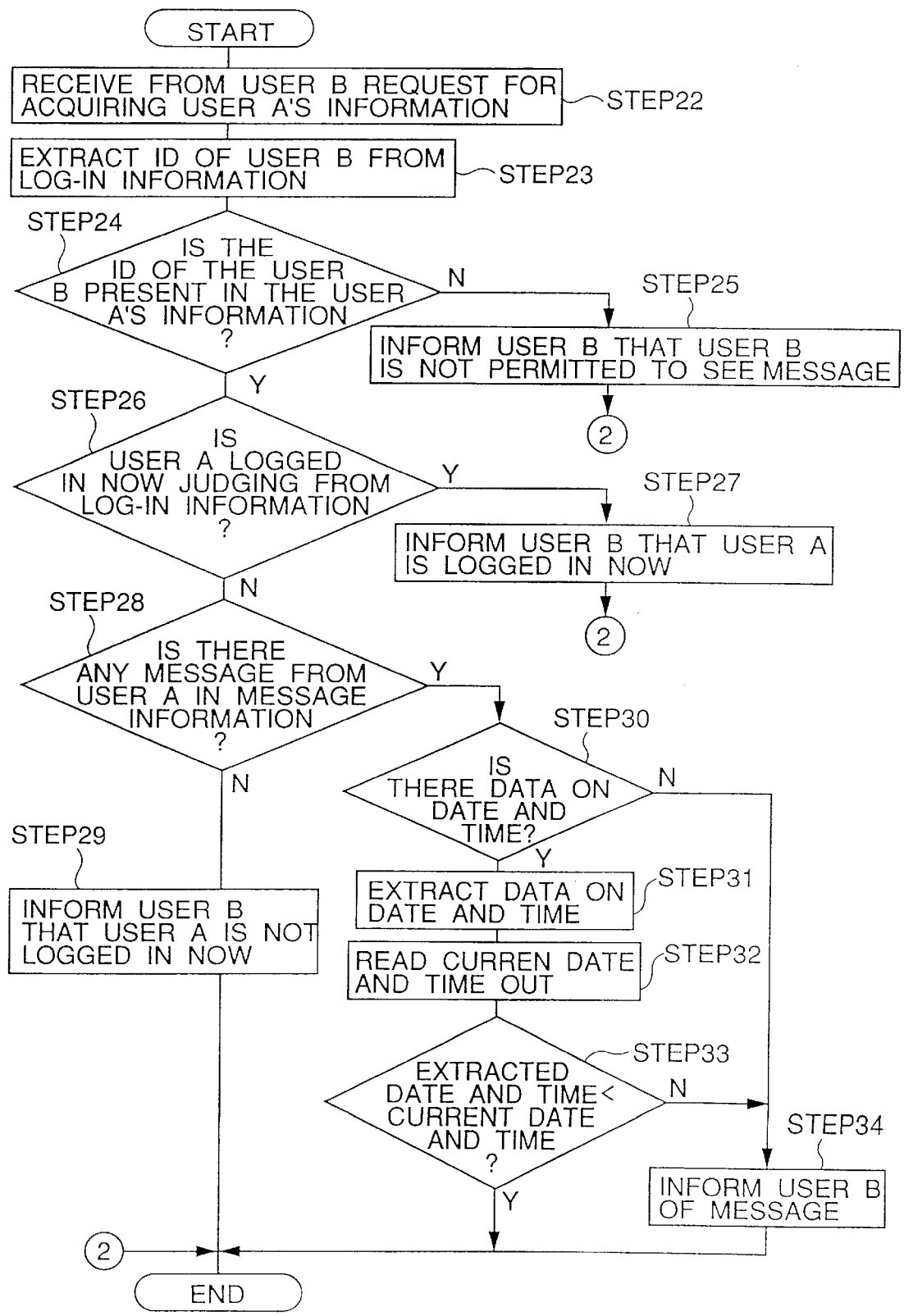

METHOD FOR ACQUIRING COMMUNICATION INFORMATION

CROSS-REFERENCE TO RELATED APPLICATIONS

This application is related to Japanese application No. Hei 9(1997)-072520, filed on Mar. 26, 1997, whose priority is claimed under 35 USC §119, the disclosure of which is incorporated by reference in its entirety.

BACKGROUND OF THE INVENTION

1. Field of the Invention

The present invention relates to a method for acquiring communication information between communication devices which are capable of transmitting and receiving electronic mail or facsimiles information.

2. Description of the Prior Art

Conventional communication devices have a function, for example, such that, if a sender transmits information to a desired receiver and then a trouble of a communication device arises at a receiver side, such trouble is generally informed to the sender for urging the sender to transmit the information again. Moreover, these devices have a function of transmitting the information to the receiver regardless of the receiver's presence or absence. However, these devices do not possess a function of informing the sender whether the transmitted information has correctly reached the desired receiver or not. Therefore, the sender needs to call the receiver on another occasion in order to confirm whether the receiver has received the transmitted information.

The Japanese Unexamined Patent Publication No. Hei 2(1990)-185158 proposes a communication device for solving this problem, which is capable of informing the corresponding sender automatically about the fact that the information transmitted by the sender has been received at the receiver side.

By the communication device in the Japanese Unexamined Patent Publication No. Hei 2(1990)-185158, the fact that the information transmitted by the sender has been received at the receiver side is positively informed to the sender. However, there is a problem such that the report is given to the sender telling that the transmitted information has been confirmed on a communication device at the receiver side, even when the receiver is not present and cannot check the transmitted information.

Especially, in the case that such communication devices are applied to a communication system which transmits or receives electronic mail between a plurality of communication devices via a host computer on a network, there is a problem such that the sender has to reconfirm whether the receiver has received the transmitted information because it is not clear when the receiver checks the transmitted information (e.g., electronic mail) unless the sender receives a return message from the receiver.

SUMMARY OF THE INVENTION

The present invention has been made with a view to overcoming the above problems. It is therefore an object of the present invention to provide a method for acquiring communication information, for example, in the case that the communication information is transmitted from a communication terminal of one user to a communication terminal of another user via a host computer on a network. By employing the method, the sender does not have to reconfirm whether the receiver has received the transmitted information, because the preliminarily registered user information of the receiver side is reported to the sender's communication terminal and, on the basis of the user information of the receiver side, the sender can find whether the receiver will really check the transmitted information or not.

Thus, the present invention provides a method for acquiring communication information in a communication system between a plurality of user communication terminals via a host computer on a network, the method comprising registering, for each user communication terminal, beforehand in the host computer a user information including a communication confirmation schedule, whereby the host computer transmits a user information of a second user communication terminal to a first user communication terminal when the host computer detects a communication connection from the first user communication terminal to the second user communication terminal.

BRIEF DESCRIPTION OF THE DRAWINGS

FIGS. 3(a) and 3(b) are views showing examples of a screen displaying a message according to the present invention;

FIG. 8 is a flow-chart showing a process performed by the server giving consideration to an information of the date and time when the user A's information is requested by the user B.

DETAILED DESCRIPTION OF THE PREFERRED EMBODIMENTS

The present invention provides a method for acquiring communication information in a communication system between a plurality of user communication terminals via a host computer on a network, the method comprising registering, for each user communication terminal, beforehand in the host computer a user information including a communication confirmation schedule, whereby the host computer transmits a user information of a second user communication terminal to a first user communication terminal when the host computer detects a communication connection from the first user communication terminal to the second user communication terminal.

The present invention also provides a method for acquiring communication information, wherein, when the host computer detects the communication connection from the first user communication terminal to the second user communication terminal, the host computer extracts the communication confirmation schedule from the user information of the second user communication terminal, compares the extracted communication confirmation schedule with a current time, and prohibits the user information of the second user communication terminal from being transmitted to the first user communication terminal if the current time falls after the extracted communication confirmation schedule.

The present invention also provides a method for acquiring communication information in a communication system between a plurality of user communication terminals via a host computer on a network, the method comprising registering, for each user communication terminal, beforehand in the host computer a user information including a communication confirmation schedule and an identification information of user communication terminals which are permitted to receive the user information, whereby the host computer examines from the identification information whether a first user communication terminal is permitted to receive a user information of a second user communication terminal, and transmits the user information of the second communication terminal to the first user communication terminal if it is found that the first user communication terminal is permitted to receive the user information of the second user communication terminal.

The present invention is now described in detail with reference to the drawings. It should be understood that the present invention is not limited by the detailed description which will be made hereinafter.

Figure 1:
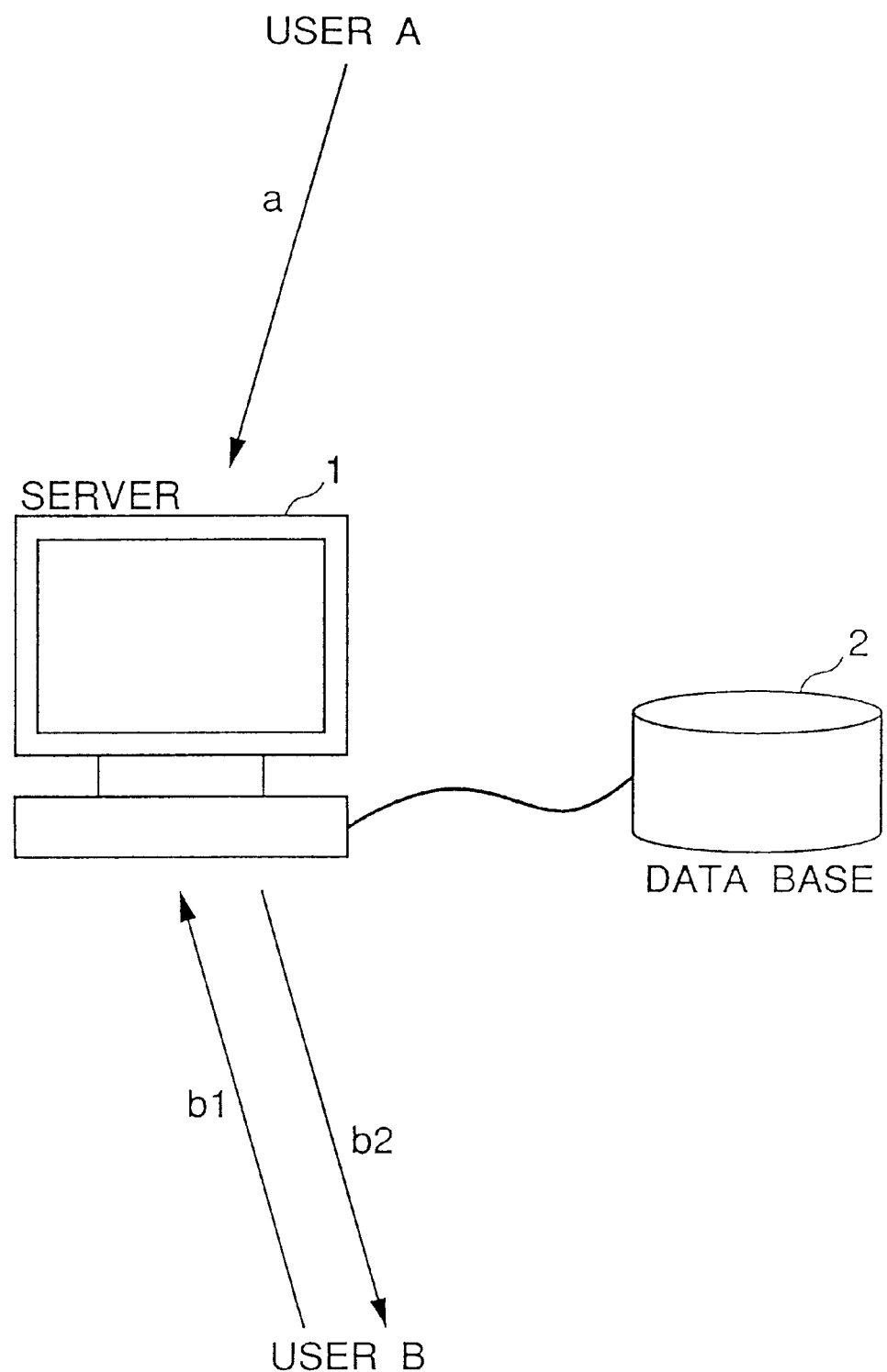
FIG. 1 is a structural diagram showing a system employing a communication information acquiring device on a network according to the present invention.

FIG. 1 is a structural diagram showing a system employing a device for acquiring communication information on a network according to the present invention.

Referring to FIG. 1, a server 1 is a computer such as a work station which loads and executes a software in order to provide a service to a number of devices on the network. A data base 2 stores information of users who are connected to the server 1, data which is used by a software for providing services and the like. The server 1 reads necessary data out from the data base 2 and executes in response to a command of reading the data out.

Figure 2:
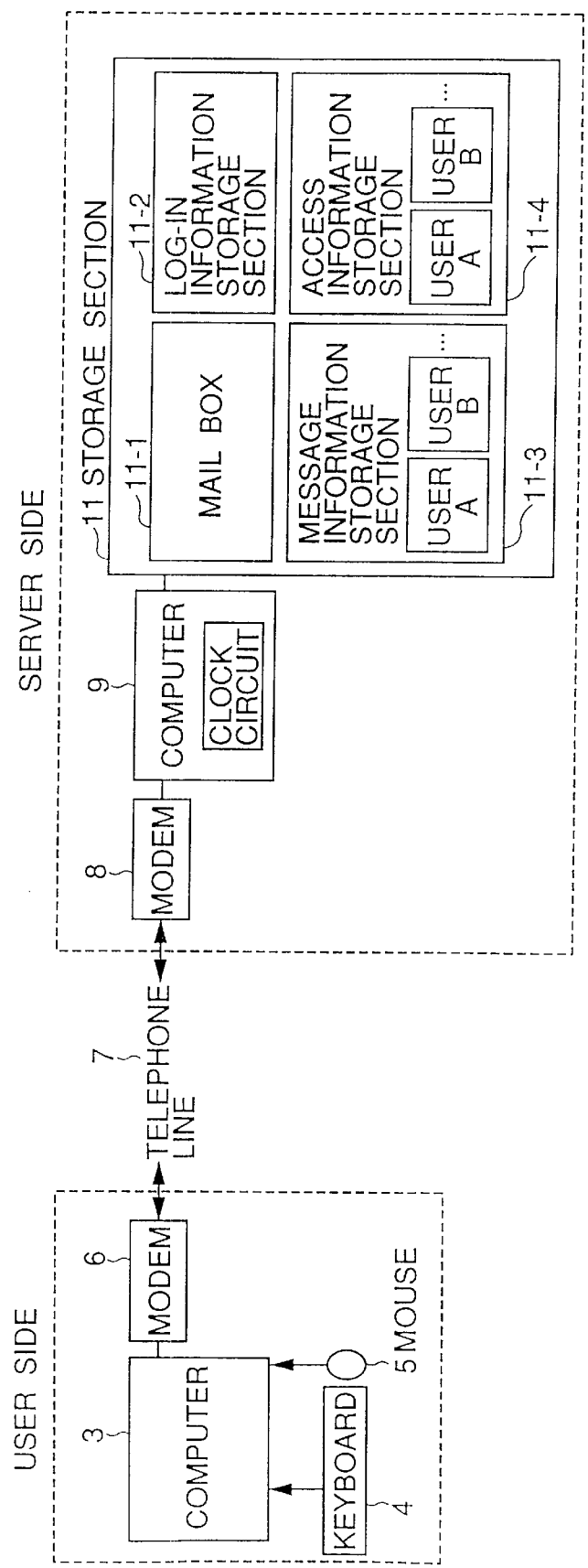
FIG. 2 is a block diagram showing a system structure employing the communication information acquiring device on the network according to the present invention.

FIG. 2 is a block diagram showing a system structure employing the device for acquiring communication information on the network according to the present invention.

A computer 3 at a user side is provided with a keyboard 4 and a mouse 5 for inputting document data such as electronic mail or messages, a display (not shown) for displaying a message and the like.

In order to transmit the document data in the form of an electronic mail which is input by means of the keyboard 4 and the mouse 5, a user needs to give a command for transmitting the document data to the computer 3. A control section in the computer 3 receiving the command for transmitting the document data transforms the document data into a digital data. The digital data obtained from the document data is transmitted to a modem 8 at a server side via a modem 6 and a telephone line 7.

The digital data received via the modem 8 is transformed into document data of original form by a computer 9 at the server side and stored in a mail box 11-1 of a storage section 11. The date and time recorded by a built-in clock circuit of the computer 9 at the server side is read out. A text of the mail together with a mail information including the data and time is stored in the mail box 11-1.

In addition to the mail box 11-1 for storing received mails, the storage section 11, which corresponds to the data base 2 in FIG. 1, is provided with a log-in information storage section 11-2 which serves to store IDs, log-in time and the like of users who are currently logged in, a message information storage section 11-3 which serves to store a message transmitted from a certain user (sender) to specific users, and an access information storage section 11-4 which serves to store IDs of specific users who are permitted to receive the message by the sender.

Process for transmitting and receiving mails between a user A and a user B who exchange electronic mail daily are described for exemplifying purposes (see FIGS. 1–3).

When the user A is in no condition to read electronic mail because of absence for a few days, the user A registers a message (a communication confirmation schedule) in the message information storage section 11-3 of the storage section 11 of the server 1 to inform that the user A will not be able to read electronic mails for a few days. Here, for example, the message shown below is registered: "It is after 9:00 AM of January 22nd that the user A can check electronic mail". In another form the message could e "user A will be unable to check electronic mail until after 9:00 a.m. on January $22^{nd}$". Moreover, at this time, IDs of specific users who are permitted to see the message are registered in the user A's area of the access information storage section 11-4 of the storage section 11 of the server 1. Here, for example, IDs of a user B and a user D are registered. The above-mentioned process is a process (a) in FIG. 1.

For example, when the user B transmits an urgent electronic mail to the user A on January 20th, the user B is anxious about when the user A reads that mail and therefore, asks the server 1 whether there are any messages from the user A. The above-mentioned process is a process (b1) in FIG. 1.

In response to the inquiry made by the user B, the server 1 displays on a screen of the user B the message registered in the server 1 by the user A as the user A's message, as shown in FIG. 3a, if the user B's ID is present in the user A's area of the access information storage section 11-4 and the user A's message is present in the message information storage section 11-3. The above-mentioned process is a process (b2) in FIG. 1.

Alternatively, when the user B inquires of the server 1 whether there are any messages from the user A to the user B on January 22nd at 10:00 AM, the server 1 extracts an information such as the date and time from the user A's message and then compares the information with the current time read from the built-in clock circuit. In this case, because the time information of January 22nd at 9:00 AM is extracted from the user A's message and the current time, i.e., January 22nd at 10:00 AM has already passed the time recorded in the user A's message, the server 1 does not deliver the message registered by the user A on the screen of the user B even though the message registered by the user A is present in the server 1.

When the user C inquires of the server 1 whether there are any messages from the user A to the user C, the server 1 delivers a message on the screen of the user C telling that the user C is not permitted to see the message registered by the user A or that there are no messages registered, as shown in FIG. 3b, because the user C's ID is not present in the user A's area of the access information storage section 11-4.

Figure 4:
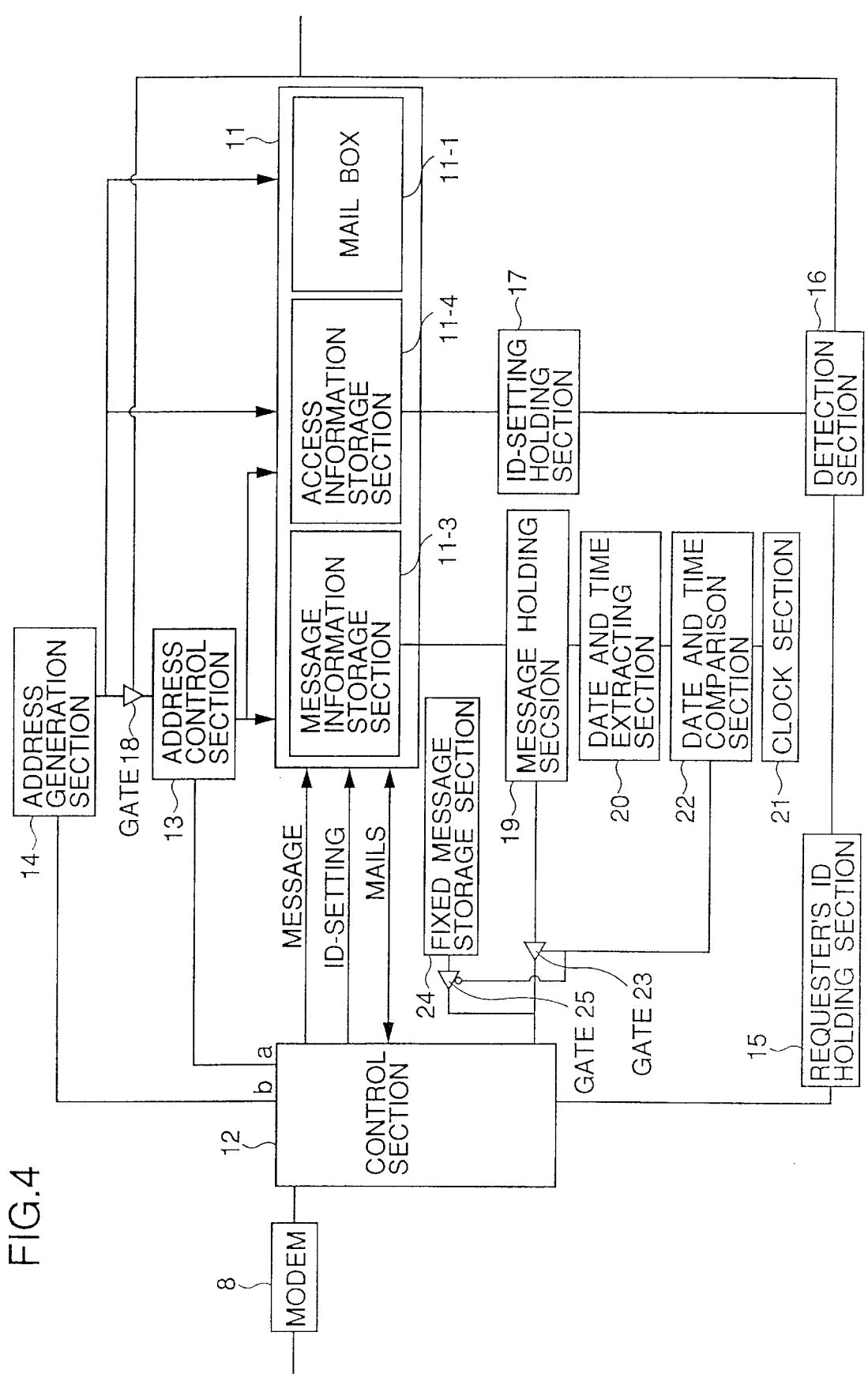
FIG. 4 is a detailed block diagram of a server.

Next, operations of the server are described with reference to a detailed block diagram of the server in FIG. 4.

Now, an explanation is given on the operations of the server when the user A sets up a message and IDs of users for specifying receivers to whom the message is to be transmitted.

When the user A selects, via the modem 8, a mode for setting up the message and IDs of users for specifying the receivers to whom the message is to be transmitted, a control section 12 outputs an ID of the user A to an address control section 13 via a route (a).

When the address control section 13 receives the user A's ID from the control section 12, the address control section 13 generates an address corresponding to the user A's ID and supplies the address to the message information storage section 11-3 and the access information storage section 11-4 of the storage section 11.

First, the message information transmitted from the user A via the modem 8 is stored at an address position, indicated by the address generation section 14, in the message information storage section 11-3. Then, IDs for specifying users permitted to receive the message which are transmitted by the user A via the modem 8, are stored at the address position of the access information storage section 11-4. Thereby, the process of setting up the message and the IDs of users is completed.

Further, operations of the server in response to users accessing the server are described.

The user B connected to the server via the modem 8 transmits an ID of a mail receiver (here, the user A's ID) to the server.

When this ID is received, the ID of the user A, to whom the message is to be transmitted, is output to the address control section 13 by the control section 12 via a route (b). On receiving the ID of the user A from the control section 12, the address control section 13 generates the address corresponding to the user A's ID and supplies the address to the access information storage section 11-4 and the mail box 11-1 of the storage section 11. Then, the IDs of the users who are permitted to receive the message, set at the user A's area in the access information storage section 11-4, are output into the ID-setting holding section 17.

In the meantime, the user B's ID transmitted for accession to the server by the user B is held in a requester's ID holding section 15 through the control section 12, and then a detection section 16 examines whether the user B's ID held in the requester's ID holding section 15 is contained in the ID-setting holding section 17 or not.

If the user B's ID is found in the ID-setting holding section 17 as a result of the examination, a gate 18 is opened by an output from the detection section 16, whereby the address in the address generation section 14 is supplied to the address control section 13. The address control section 13 receiving the address from the address generation section 14 outputs the address to the message information storage section 11-3 and thereby, the message set at the address by the user A is output to a message holding section 19 and held there.

At a date and time extracting section 20, a date and time information is extracted from the message text held in the message holding section 19. The date and time extracted at the date and time extracting section 20 is compared at a date and time comparison section 22 with a current date and time obtained at a clock section 21. If the date and time extracted from the message text is not in the past, a gate 23 is opened by an output from the date and time comparison section 22, whereby the text of the message held in the message holding section 19 is sent to the control section 12. Thus, the message is transmitted to the user B.

On the other hand, if the date and time extracted from the message text is in the past, a message text (for example, stating that there is no preliminarily stored message) in a fixed message storage section 24 is output via a gate 25 to the control section 12 and transmitted to the user B.

Figure 5:
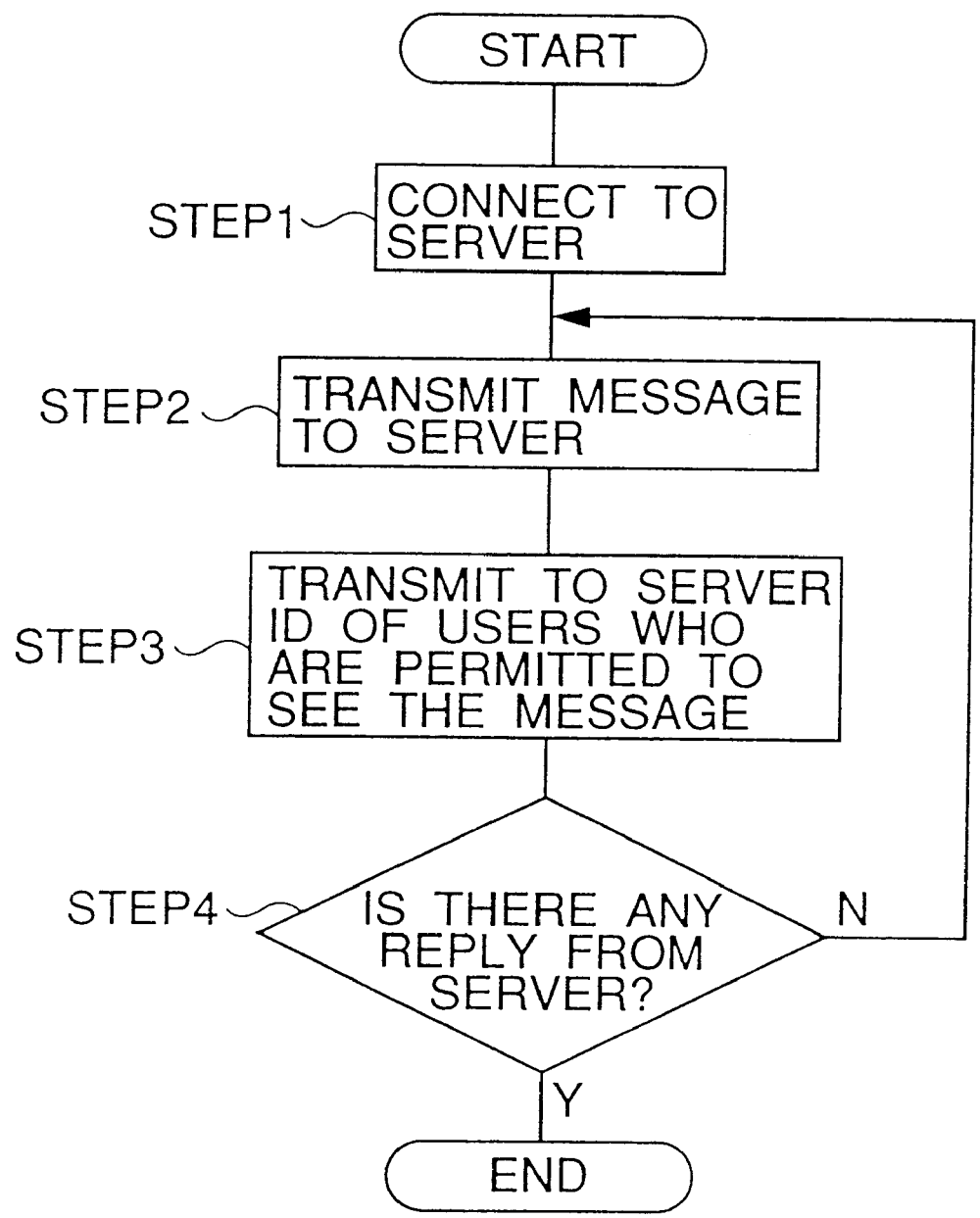
FIG. 5 is a flow-chart showing a process performed by a user A for setting in the server an information such as a message and IDs of users who are permitted to see this message.

FIG. 5 is a flow-chart showing a process performed by the user A for setting information, such as a message and IDs of users who are permitted to see this message in the server.

First, at STEP 1, the user A connects the computer 3 at the user side to the server via the telephone line 7. At STEP 2, an instruction informing that the user A will set a message is transmitted to the server and then, a message is input and transmitted to the server. At STEP 3, IDs of users who are permitted to see the message transmitted at STEP 2 are input and transmitted to the server. Then, at STEP 4, the user A confirms whether there is a reply from the server telling that the data transmitted at STEP 2 and at STEP 3 are surely received or not. If there are no replies confirming a receipt from the server, the process needs to return to STEP 2 for setting again. If there is a reply confirming a receipt from the server, a setting process is ended.

Figure 6:
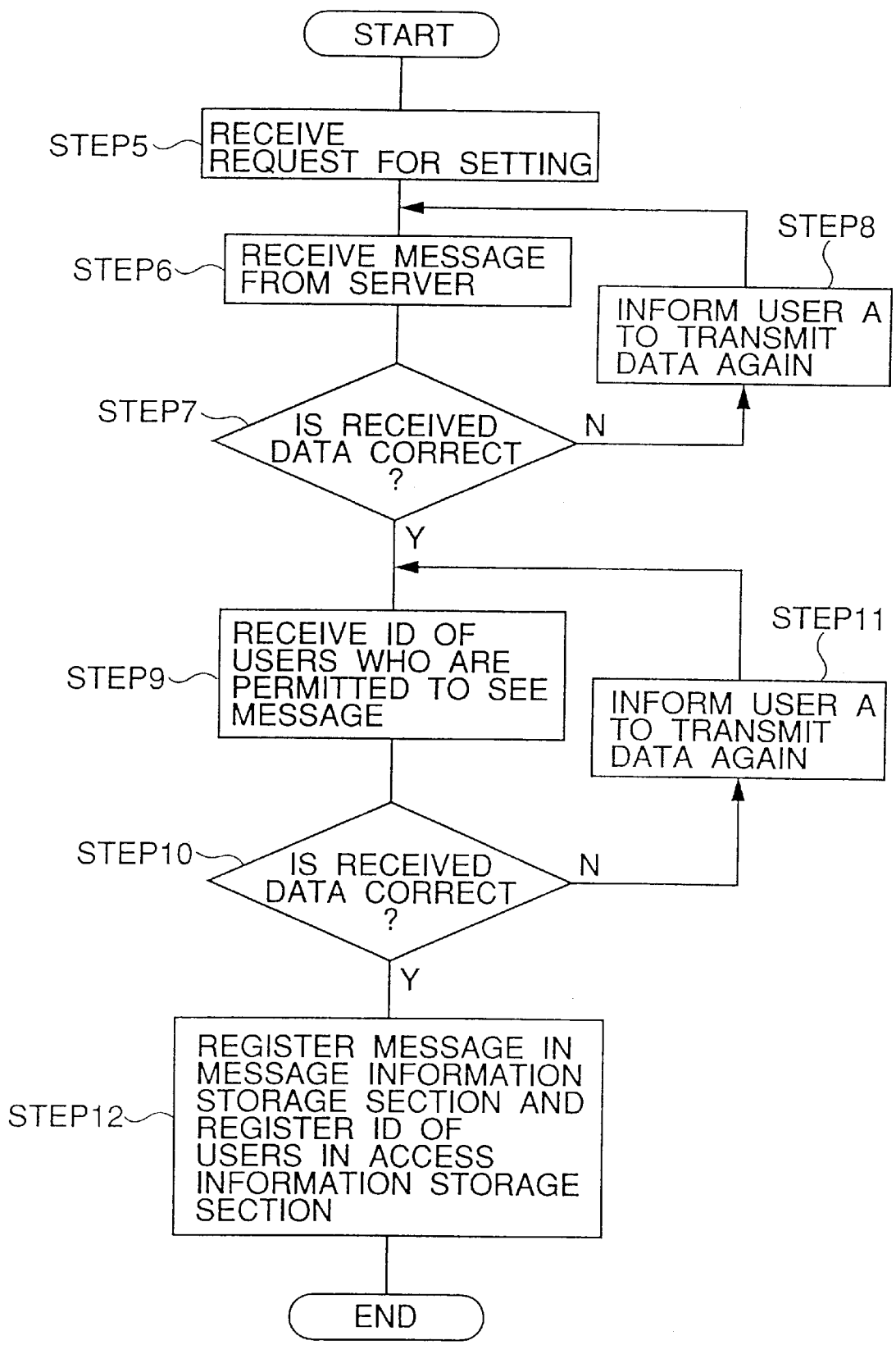
FIG. 6 is a flow-chart showing a process performed by the server for registering the user A's setting.

FIG. 6 is a flow-chart showing a process in the server for registering the setting of the user A.

First, at STEP 5, a request of setting from the user A is received. At STEP 6, the message transmitted via the telephone line 7 from the user A is received. At STEP 7, whether the message received at STEP 6 is correctly received data or not is checked by means of a parity bit or the like. If the received data is not correctly received, the server informs the user A to transmit correct data again at STEP 8. If the received data is found to be correctly received when the data is checked at STEP 7, the process goes to STEP 9.

At STEP 9, the IDs of users who are permitted to see the message transmitted by the user A are received. At STEP 10, whether the information of users' IDs received at STEP 9 is a correctly received data or not is checked by means of a parity bit or the like as in STEP 7. If the received data is not correctly received, the server informs the user A to transmit correct data again at STEP 11. If the received data is found to be correctly received when the data is checked at STEP 10, the process goes to STEP 12.

At STEP 12, the message transmitted by the user A is registered in the message information storage section 11-3 of the storage section 11 of the server, and IDs of users who are permitted to see the message are stored in the access information storage section 11-4 of the storage section 11 of the server.

Figure 7:
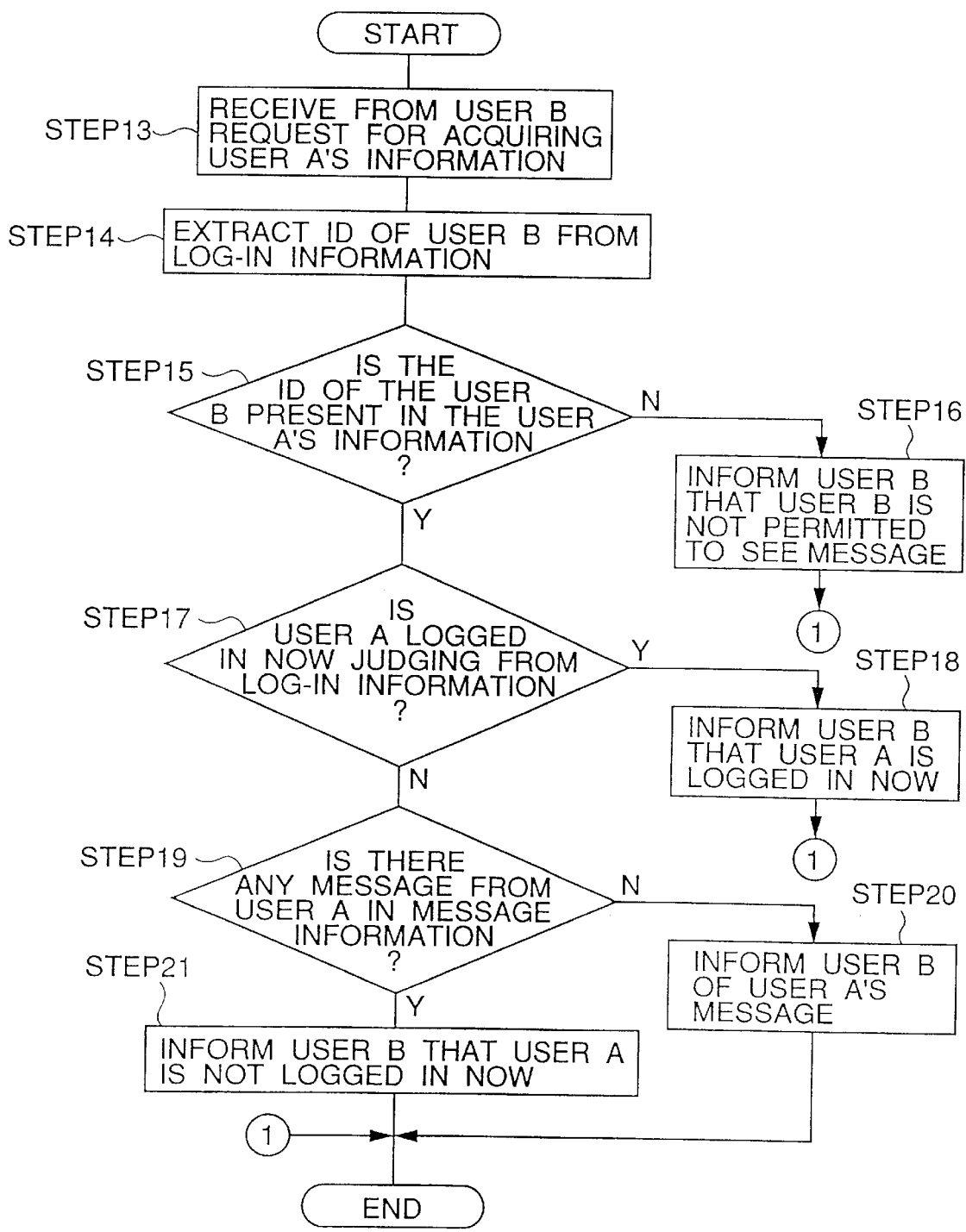
FIG. 7 is a flow-chart showing a process performed by the server when a user A's information is requested by a user B.

FIG. 7 is a flow-chart showing a process in the server when the user A's information is requested by the user B.

First, at STEP 13, the server receives a request for acquiring the user A's information from the user B. Then, at STEP 14, the ID of the user B is extracted from the log-in information in the log-in information storage section 11-2 of the storage section 11 of the server. Next, at STEP 15, the server checks whether the ID of the user B extracted at STEP 14 is present in the user A's area of the access information storage section 11-4 or not.

If the ID of the user B is not present in the user A's area of the access information storage section 11-4, the server informs the user B at STEP 16 that the user B is not permitted to see the message and the process is ended.

On the other hand, if the ID of the user B is present in the user A's area of the access information storage section 11-4, whether the user A is logged in now or not is examined according to the log-in information in the log-in information storage section 11-2 at STEP 17. If the user A is logged in now, the server informs the user B at STEP 18 that the user A is logged in now and the process is ended.

If the user A is not logged in now, the server examines at STEP 19 whether or not the user A's message is present in the message information storage section 11-3 of the storage section 11 of the server. If the user A's message is present in the message information storage section 11-3, the server informs the user B of the user A's message in the message information storage section 11-3 at STEP 20 and the process is ended.

If the user A's message is not present in the message information storage section 11-3, the server informs the user B at STEP 21 that the user A is not logged in now and the process is ended.

FIG. 8 is a flow-chart showing a process performed by the server giving consideration to an information of the date and time when the user A's information is requested by the user B.

Explanations of the process at STEPs 22–27 are omitted because the process at STEPs 22–27 is same as the one at STEPs 13–18.

If at STEP 26 the server judges from the log-in information in the log-in information storage section 11-2 that the user A is not logged in now, the server examines at STEP 28 whether there are any messages from the user A in the message information storage section 11-3 of the storage section 11 of the server. If the user A's message is not present in the message information storage section 11-3, the server informs the user B at STEP 29 that the user A is not logged in now and the process is ended.

If there is any messages from the user A in the message information storage section 11-3, the server examines at STEP 30 whether or not there is any data on a date and time in the user A's message stored in the message information storage section 11-3. If no data on the date and time is found there, the process goes to STEP 34.

If any data on the date and time is found in the user A's message, the data on the date and time is extracted from the user A's area in the message information storage section 11-3 at STEP 31. Next, a current date and time is read by the built-in clock circuit 10 in the computer 9 of the server at STEP 32. Then, at STEP 33, the date and time extracted at STEP 31 is compared with the current date and time read at STEP 32.

If it is found from the comparison at STEP 33 that the current date and time falls after the date and time extracted from the user A's area in the message information storage section 11-3, the process is ended. Alternatively, the process may go to STEP 29.

If the current date and time is found to fall before the date and time extracted from the user A's area in the message information storage section 11-3, the server informs the user B of the message read from the user A's area in the message information storage section 11-3 at STEP 34 and the process is ended.

According to the above-mentioned process, specific users who request for acquiring the user information can be informed of the message telling the date and time when the user will log in next time. Moreover, if the date and time when a user requests for acquiring the user information falls after the date and time set in the message, it is possible to prohibit the message from being delivered.

In the above example, the registered message is transmitted upon the request from the accessing user. Alternatively, when a connection from a certain user is detected, the message may be transmitted to the user even if there is no request from the user, provided that the user is a registered user. The message may be transmitted before or after the user transmits a mail.

Still alternatively, the message may be transmitted to all the accessing users when no particular users are registered. Also, for each user, a plurality of message may be registered in the host computer, whereby a different message may be transmitted to an accessing user in accordance with the date and time when the user accessed to the host computer.

The present invention provides the following advantages:

(1) In a network system consisting of a plurality of user communication terminals, and a host, user information of every user communication terminal is preliminarily registered in the host. When a communication connection with the host from a first user communication terminal to a second user communication terminal is detected, the user information of the second user communication terminal is transmitted to the first user communication terminal. Therefore, if the user information such as a time when the second user communication terminal will log in next time is registered, the situation of the second user is reported to the first user even when the second user is absent, so that the first user does not have to wonder whether mail has been received and read by the second user or not.

(2) In the case that an extracted time information is in the past when the time information extracted from the user information is compared with a current time, transmission of the user information is suppressed, so that it is possible to prevent an inconvenience such that, even when the time mentioned in the message (user information) set by the second user is in the past, the message is still transmitted to the first user meaninglessly, that is, a useless information is transmitted.

(3) In a network system consisting of a plurality of user communication terminals and a host, user information of every user communication terminal and identification information of user communication terminals which are permitted to receive the user information are preliminarily registered in the host. When the communication connection with the host from the first user communication terminal to the second user communication terminal is detected, the host examines from the identification information whether the first user communication terminal is permitted to receive the user information of the second user communication terminal. When the first user communication terminal is a permitted user, the user information of the second user communication terminal is transmitted to the first user communication terminal. Therefore, if the user information such as a time when the second user communication terminal will log in next time is registered, the situation of the second user is reported to the first user even when the second user is absent, so that the first user does not have to wonder whether a mail has been received and read by the second user or not. Moreover, the second user can maintain secrecy of the user information because the user information is transmitted only to the permitted user communication terminals.

What is claimed is:

1. A method for acquiring communication information in a communication system between a plurality of user communication terminals via a host computer on a network, the method comprising:

registering, for each user communication terminal, beforehand in the host computer user information including a communication confirmation schedule, transmitting by the host computer information of a second user communication terminal to a first user communication terminal when the host computer detects a communication connection from the first user communication terminal to the second user communication terminal.

2. The method for acquiring communication information of claim 1, wherein, when the host computer detects the communication connection from the first user communication terminal to the second user communication terminal, the host computer extracts the communication confirmation schedule from the user information of the second user communication terminal, compares the extracted communication confirmation schedule with a current time, and prohibits the user information of the second user communication terminal from being transmitted to the first user communication terminal if the current time falls after the extracted communication confirmation schedule.

3. A method for acquiring communication information in a communication system between a plurality of user communication terminals via a host computer on a network, the method comprising:

registering, for each user communication terminal, beforehand in the host computer user information including a communication confirmation schedule and an identification information of user communication terminals which are permitted to receive the user information, examining by the host computer from the identification information whether a first user communication terminal is permitted to receive a user information of a second user communication terminal, and transmitting the user information of the second user communication terminal to the first user communication terminal if it is found that the first user communication terminal is permitted to receive the user information of the second user communication terminal.

4. The method for acquiring communication information of claim 3, wherein, when the host computer detects a communication connection from the first user communication terminal to the second user communication terminal, the host computer extracts a communication confirmation schedule from the user information of the second user communication terminal, compares the extracted communication confirmation schedule with a current time, and prohibits the user information of the second user communication terminal from being transmitted to the first user communication terminal if the current time falls after the extracted communication confirmation schedule.

5. The method of acquiring communication according to claim 1, wherein the communication system transmits e-mail messages.

6. The method of acquiring communication according to claim 3, wherein the communication system transmits e-mail messages.

7. A method for acquiring communication information in a communication system between a plurality of user communication terminals via a host computer on a network, the method comprising:

registering beforehand in the host computer, communication confirmation-permitted schedule information indicating an electronic message check-permitted time at each user communication terminal, transmitting by the host computer the communication confirmation-permitted schedule information of a second user communication terminal to a first user communication terminal when the host computer detects a communication connection from the first user communication terminal to the second user communication terminal.

8. A method for acquiring communication information according to claim 7, wherein when the host computer detects the communication connection from the first user communication terminal to the second user communication terminal, the host computer extracts the electronic message check-permitted time of the second user from the communication confirmation-permitted schedule information, compares the extracted electronic message check-permitted time with a current time, and delivers a message to the first user communication terminal telling that an electric mail can not be checked if the current time falls after the extracted check-permitted time of e-mail messages.

9. A method for acquiring communication information in a communication system between a plurality of user communication terminals via a host computer on a network, the method comprising:

registering beforehand in the host computer, user information including communication confirmation-permitted schedule information indicating an electronic message check-permitted time at each user communication terminal, and an identification information of user communication terminals which are permitted to receive the user information, examining by the host computer on the basis of the identification information whether a first user communication terminal is permitted to receive user information of a second user communication terminal, and transmitting the user information of the second user communication terminal to the first user communication terminal if the first user communication terminal is permitted to receive the user information of the second communication terminal.

10. A method for acquiring communication information according to claim 9, wherein when the host computer detects a communication connection from the first user communication terminal to the second user communication terminal, the host computer extracts a communication check-permitted schedule from the user information, compares the electronic message check-permitted time of the extracted communication confirmation-permitted schedule with a current time, and prohibits the user information of the second user communication terminal from being transmitted to the first user communication terminal if the current time falls after the extracted electronic message check-permitted time.

* * * * *